United States Patent [19]
Keidl

[11] 4,313,140
[45] Jan. 26, 1982

[54] BURIED CONTROL SIGNAL RECORDING SYSTEMS AND METHOD

[75] Inventor: Steven D. Keidl, Rochester, Minn.

[73] Assignee: International Business Machines Corporation, Armonk, N.Y.

[21] Appl. No.: 101,379

[22] Filed: Dec. 7, 1979

[51] Int. Cl.³ ............................................. G11B 21/10
[52] U.S. Cl. ........................................ 360/77; 360/70; 360/18; 360/131
[58] Field of Search ............................. 360/75-78, 360/131, 18-20, 70, 51, 60

[56] References Cited

U.S. PATENT DOCUMENTS

| | | | |
|---|---|---|---|
| 3,404,392 | 10/1968 | Sordello | 360/77 |
| 3,534,344 | 10/1970 | Santana | 360/77 |
| 3,765,005 | | Cannon | 360/25 |
| 3,821,798 | 6/1974 | Cannon | 360/51 |
| 3,845,500 | | Hart | 360/77 |
| 3,956,769 | 5/1976 | Beecroft | 360/131 X |
| 4,110,799 | 8/1978 | Bergmans | 360/77 X |

OTHER PUBLICATIONS

IBM/TDB, vol. 17, No. 2, Jul. 1974, "Recording Servo Info. . . .", by Schwarz.

*Primary Examiner*—John H. Wolff
*Attorney, Agent, or Firm*—Herbert F. Somermeyer

[57] ABSTRACT

A single gap transducer simultaneously senses recorded control or servo signals and records data signals. A magnetic medium used with this invention is preferably a single coating magnetic medium. During recording, the recording signal is appropriately subtracted from the readback signal for removing write signal effects on the readback signal. The servo signals are preferably deeply recorded into the magnetic coating whereas the data signals are preferably recorded in an outer surface portion of the magnetic coating.

31 Claims, 4 Drawing Figures

BURIED CONTROL SIGNAL RECORDING SYSTEMS AND METHOD

CROSS-REFERENCE TO CO-FILED COMMONLY-ASSIGNED PATENT APPLICATIONS

Haynes Ser. No. 101,380 filed Dec. 7, 1979 discloses and claims an invention related to the present application.

DOCUMENTS INCORPORATED BY REFERENCE

U.S. Pat. No. 3,534,344 shows a disk-type recorder with a servo controlled head positioner usable to position a transducer in accordance with a position error signal PES generated by using the present invention.

U.S. Pat. No. 3,845,500 shows a rotating head tape recorder using tape to head servo positioning which may use a position error signal PES generated using the present invention.

BACKGROUND OF THE INVENTION

The present invention relates to recording systems and particularly to those systems employing continuous buried control signals such as used in servos for faithful track following operations to enable high track densities with high lineal densities.

It has long been recognized that, if a servo signal, i.e., a track location indicating signal, could be superposed with a data signal, higher areal density recording can be more easily achieved with a high degree of faithful reproduction. Even though such techniques have been known to be desirable, they have never been commercially exploited, apparently because of the degradation of the so-called buried servo or track-position indicating signals or the expense of providing a multiple layer magnetic coating, one for the position indicating signals and another for the data signals.

An early teaching of superposed data and servo signals is found in the F. J. Sordello U.S. Pat. No. 3,404,392. This patent teaches using a dual layer magnetic coating on a disk substrate. A lower layer has a higher retentivity and coercivity than an upper layer. A servo signal is first recorded in the lower layer for indicating track position. Following such recording, data signals were recorded. Then both the servo and data signals were sensed. There were no recording operations based upon sensing the servo signals. For each data recording operation, an erase gap preceded a read/write gap so that the data signals could be successfully recorded in the upper layer. During readback not only were the data signals read back by a single gap, but also two sets of servo signals were simultaneously read back. The Sordello servo signals were linearly recorded sine waves written in concentric circular tracks and exhibiting a low frequency. Adjacent servo tracks were written at different frequencies. Each data track was defined as being superposed over one-half of an odd numbered servo track and one-half of an even numbered servo track. Sordello teaches that the data signals and the servo signals must exist in the magnetic medium independently of the other. Sordello also teaches that in a dual layered record medium recording the data signals at a high frequency, at least three or four times the frequency of the servo signals in the lower layer, enables the data signals to be separated from the servo signals by filtering. The independence requirement was met by Sordello providing a record disk having a lower level with a higher coercivity than an upper data signal layer. This arrangement allowed the servo signals to remain undisturbed by subsequent writing and rewriting of data signals in the upper layer. The single gap in the Sordello recorder was significant for purposes of having perfect alignment for simultaneously reading the control or servo signals with the data signals.

A later development in the quest for achieving buried servo operation is shown by T. A. Schwarz in the IBM Technical Disclosure Bulletin, Vol. 17, No. 2, July 1974, beginning at page 536. Schwarz shows a single magnetic coating on a substrate. Schwarz teaches that the ratio of the frequency of the data signals to the servo signal should be 10:1 and that the servo signal can be successfully recorded with a head having sufficient ampere-turns capability. The Schwarz system apparently resulted in degradation of the recorded servo signals by repeated partial erasures each time data signals were recorded thereon. It also should be noted that Schwarz teaches it is necessary to erase before rerecording data signals. Schwarz also suggests the use of DC bias recording.

M. R. Cannon in U.S. Pat. No. 3,765,005 teaches using a clock-bias signal at the upper end of a data signal frequency spectrum. Also, U.S. Pat. No. 3,821,798 shows a low frequency control signal recorded at a lower end portion of the data signal pass band.

A later reference showing buried servo is Beecroft et al U.S. Pat. No. 3,956,769. Beecroft et al teach the use of two separate gaps in a transducer; one for servo signals and one for data signals. The present invention obviates the requirement for separate gaps.

SUMMARY OF THE INVENTION

It is the object of the present invention to provide an improved "buried" control signal recording apparatus and methods.

In accordance with the invention, a magnetic recorder has a single-gap magnetic transducer adapted to exchange signals with an adjacent magnetic record medium. The record medium has a deeply recorded control signal. The term "deeply recorded" means that the signal exhibits a retentivity characteristic exemplified by signals recorded deeply into a magnetic coating of a record medium—as opposed to shallow recording of information-bearing or data signals. The control signal is preferably but not limited to a narrow-band low-frequency signal such as presently used in known disk track-following servo systems. The single-gap transducer is connected to a recording means having high-pass frequency characteristics for supplying information-bearing signals to the transducer for recording same on the adjacent magnetic surface. Also connected to the transducer is a control signal circuit having band or low-pass frequency characteristics and connected to the transducer for receiving sensed control signals simultaneously while the write means is supplying the information-bearing signals for recording. The recording and sensing operations occur simultaneously via the single-gap transducer. The recorder also has an information-bearing signal readback circuit. Signal compensation techniques enhance the simultaneous read while record operations.

The foregoing and other objects, features and advantages of the invention will be apparent from the following more particular description of a preferred embodi-

THE DRAWINGS

DETAILED DESCRIPTION

Figure 1:
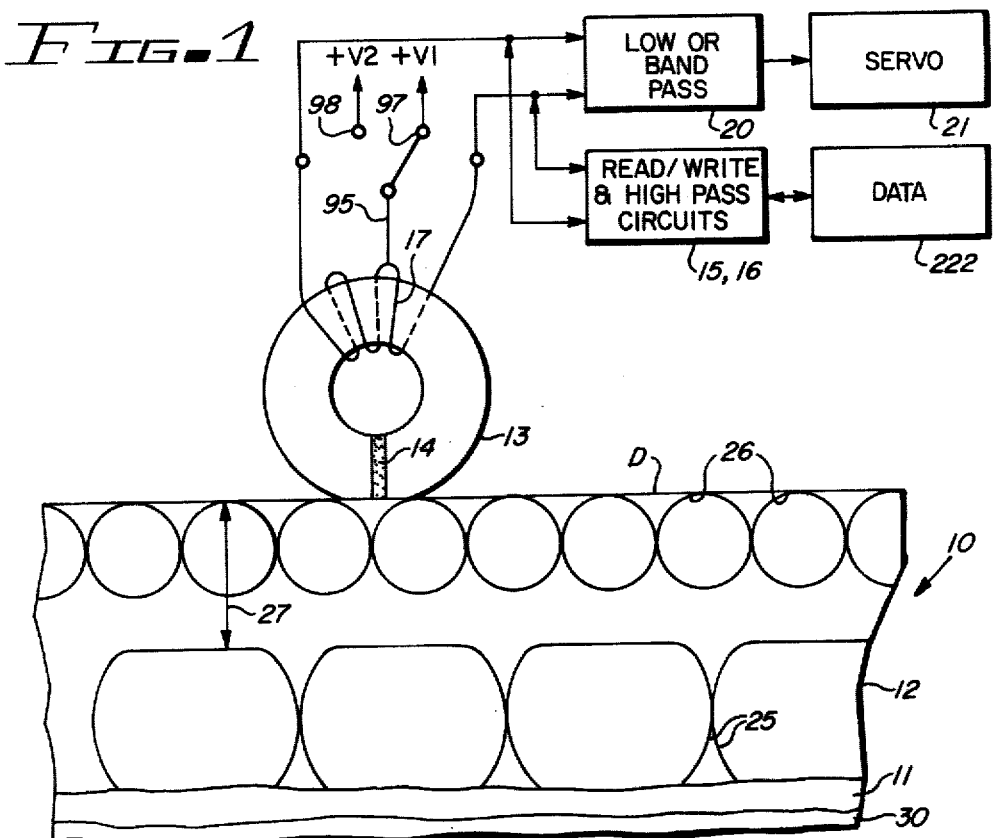
FIG. 1 is a diagrammatic showing of apparatus employing the present invention.

Referring now more particularly to the drawing, like numerals indicate like parts and structural features in the various diagrams. A magnetic record medium 10 consists of a suitable substrate 11 supporting a magnetic coating 12. Coating 12 can be any usual magnetic coating, preferably a magnetic oxide, no limitation thereto intended. Substrate 11 can be in either a tape, disk, card or other shape.

Transducer 13 scans a data track D along the surface of coating 12. A single read/write gap 14 faces coating 12 for enabling transducing operations, as is well known. The length of gap 14—i.e., the length as measured along the longitudinal direction of track D, is designed to operate with the data signal frequencies to be exchanged with coating 12, as later described.

A coil 17 magnetically linked to transducer 13 and gap 14 is electrically connected in a differential manner to write circuit 15 and read circuit 16. Additionally, coil 17 is also electrically connected to low or band pass filter 20 which in turn supplies later described servo positioning signals to servo circuits 21. Circuits 21 in turn actuate a voice coil motor 22 (FIG. 2) for relatively positioning medium 10 and transducer 13, as is well known in the recording arts and as described in documents incorporated by reference. Read and write circuits 15, 16 are in turn connected to data utilization circuits 222 which are included within the utilization circuits 23 of FIG. 2. Circuits 23 can be an input/output controller usable in a data processing subsystem as is widely practiced in the data processing arts.

Figure 2:
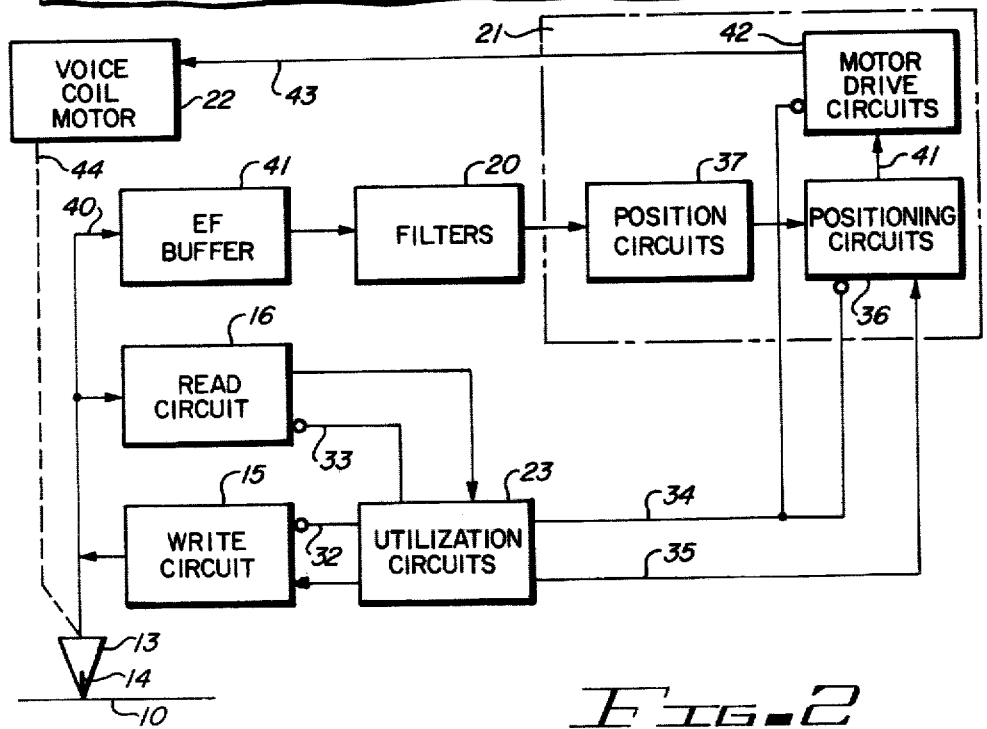
FIG. 2 is a diagrammatic showing of one embodiment employing simultaneous read and write operations using a single gap transducer.

While practicing the present invention with the apparatus shown in FIGS. 1 and 2, a low frequency servo or control signal is deeply recorded through the thickness of coating 12 as represented by the symbols 25. Such can be achieved by supplying large recording current through coil 17 or making gap 14 longer than usually selected for recording data signals as represented by symbols 26. As an example, the low frequency deeply recorded signals 25 can be a 10.8 kilohertz fundamental frequency using known track position indicating signals. After deeply recording signals 25, a lower energy erase signal (achieved by reducing the ampere turns for example) of either DC or AC bias current, erases an upper portion of coating 12, such portion being represented diagrammatically by double-headed arrow 27. It is to be appreciated that such erasure in the practical embodiment does not provide for a sharp demarcation between the deeply recorded signal 25 and the then erased portion 27. There will be a graded boundary extending between signals 25 and the erased portion 27; that is, the portion of adjacent track D which is a surface of coating 12 will be more thoroughly erased than the portions adjacent the indicated signal 25. The purpose of this erasure is to stabilize a guard band between the signals 26 and the signals 25. Such spatial magnetic separation within coating 12 enhances separation of signals 26 and 25 for preventing compliance modulation of the position indicating or servo signals 25 by the erasing effect of the recording of data signal 26. Then in the last and operational steps, data signals 26 are recorded at yet lower ampere turn energy levels and preferably at higher frequency such that magnetic remanence due to the data signal being recorded resides primarily adjacent the outer surface of coating 12. Such data recording currents are the same as used for recording data signals without the presence of deeply recorded track position indicating or servo signals 25. By a judicious selection of data signals 26 and track position indicating signals 25, there will be no interaction in recording or sensing both signals through the single gap 14 of single gap transducer 13. Such selection includes frequency separation and selecting data and control encoding techniques to avoid coincident high energy levels from the signals. Such separation can be achieved by using known filter constructions; that is, circuits 15, 16 include high pass filter characteristics in their circuit design whereas filter 20 includes low or band pass filter characteristics. It is preferred that band pass filtering be used in filter 20 in that it is preferred that the track position indicating or servo signals 25 be extremely narrow band. Low pass filtering will work, but band pass is preferred.

Using all of the above described techniques, the present invention teaches that track position indicating signals 25 (a specialized form of deeply recorded signals) are sensed by transducer 13 via gap 14 for passing the control signals to servo 21 via filter 20 while write circuit 15 of circuits 15, 16 is simultaneously supplying data signal energy for recording signal 26 in the upper portion of coating 12. The use of a single gap for both recording and sensing simplifies recorder operation in many respects; however, it was discovered that using the single gap for simultaneous recording signals 26 while sensing signals 25 requires no additional separation activity than that required for the prior art systems which employed two gaps. The prior art does not suggest how to record data signals in precise spatial synchronism to deeply recorded servo signals 25. The simultaneous sensing of signals 25 and 26 does not relate to using the same gap 14 for simultaneously recording signals 26 while sensing signals 25. Using transducer 13 as a simultaneous bilateral transducer provides enhanced utilization of and control from such deeply recorded control signals.

Recording data signals 26 results in relatively large signal voltages occurring across coil 17; that is, greater than 10 volts peak-to-peak. The coil 17 voltage induced by sensing signals 25 due to relative motion between medium 10 and transducer 13 has been about 450 microvolts. Because of selective frequency separation, it is reasonable to filter out the large recording signals supplied by circuit 15 from the sensed servo positioning signal to be supplied to servo circuits 21 through filter 20. The just described technique is also applicable to where data signals 26 are recorded in a first coating 12 on a substrate 11 while the control signal 25 is recorded in coating 30. In this embodiment, substrate 11 acts as a magnetic guard band between coatings 12 and 30; control signals 25 only occurring in coating 30 while data signals 26 occur in coating 12.

Tests have shown that the effective head gap length widens due to pole tip saturation. Since the servo signal 25 is being sensed during data signal 26 recording (which may cause pole tip saturation) and the fact that the servo signal is relatively low frequency, the sensed readback signal derived from recorded signal 25 remains unchanged. Tests have verified this phenomenon. Therefore, for reading low frequency signals, pole tip saturation by high frequency recording currents during simultaneous recording and reading enhances the readback operation.

A single head having a single gap can be employed for all operations. This is not to say that the single gap head 13 cannot have a separate erase gap; the term single gap transducer as used herein means a single gap for signal translation between medium 10 and the recorder circuit 15 et seq. The head gap 14 being short with the short data wavelength signals 26 with modest ampere turn recording signal amplitudes reduces interference with the deeply recorded signals 25.

FIG. 2 shows a block diagram of a recorder employing the invention as above described. Utilization circuits 23 selectively actuate write circuit 15 via control line 32 and read circuit 16 via control line 33. Activation is mutually exclusive. Further, servo circuits 21 are activated for relatively controlling the position of transducer 13 and record medium 10 by a control signal supplied over line 34. Desired positioning signals; i.e., addressing signals, are supplied over a plurality of lines indiciated by numeral 35 to positioning circuits 36 of servo circuits 21. Deeply recorded position indicating signals 25 are translated by transducer 13 and supplied as electrical signals over line 40 through an emitter follower buffer 41 to filters 20. Circuits 36 receive a current position signal from circuits 37 which derive the positional information from filter 20. Position circuit 37 decode or detect the sense d.c. signals for indicating position to position circuit 36. Position circuit 36 compares the signals from circuits 37 with the desired address signals on lines 35 to provide a position error signal over line 41 to motor drive circuits 42. Circuits 42 are constructed in the usual manner and supply positioning drive signals over line 43 to voice coil motor 22 in the usual manner. Voice coil motor 22 is mechanically coupled to transducer 13, for example, as indicated by dash line 44, for enabling relative motion between transducer 13 and medium 10. Motor 22 can either position transducer 13, medium 10 or both. The just described servo loop is well known and it operates in the usual manner with the deeply recorded signals 25 and is operated continuously while utilization circuits 23 are activating either write circuit 15 or read circuit 16.

The above described apparatus imposes certain constraints on the bandwidth of the recorded data signals 26. It has been discovered that such constraints of non-frequency overlap between signals 26 and 25 are unnecessary while still successfully practicing certain aspects of the present invention. In general, the data signals being recorded by write circuit 15 are used as a compensation input for adjusting the sensed signals from deeply recorded signals 25 for more faithfully providing accurate position or control information through low or bandpass filters 20. With this arrangement, wider band information-bearing signals can be recorded with a deeply recorded signal 25 in diverse control applications; that is, deeply recorded signals 25 may not only be used for position indication but also for spindle speed timing, as security codes (security codes require modulation which means that the bandwidth of the deeply recorded signals is greater) and other control applications. Therefore, the bandwidth of both the deeply recorded signals 25 and the other information-bearing signals 26 may be broadened for enhancing the breadth of application of certain broad aspects of the present invention.

Figure 3:
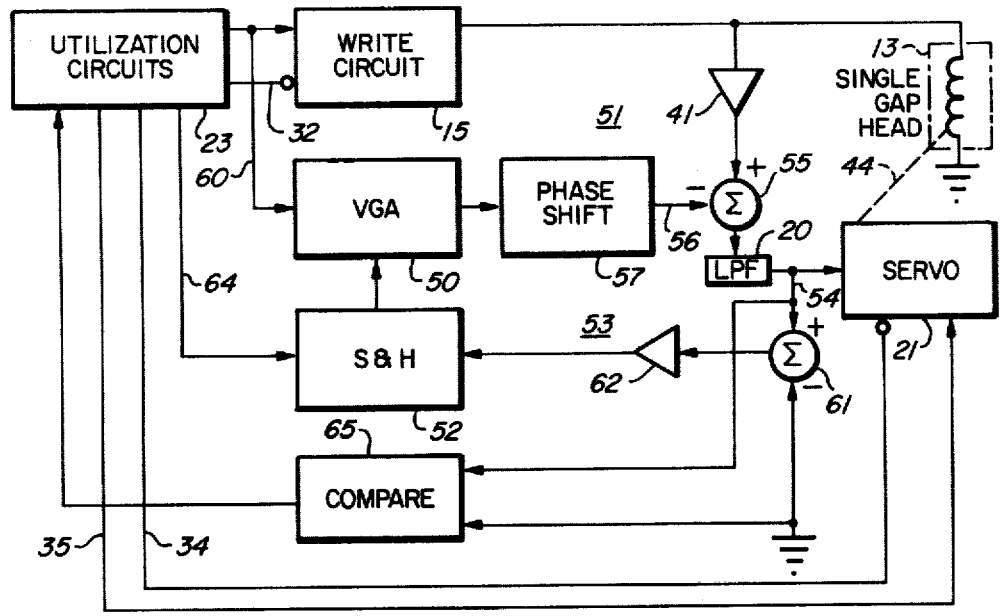
FIG. 3 is a schematic illustration of a write-while-read recorder employing subtractive signal compensation for enabling broad-band information-bearing signal recording.

In accordance with the second aspects of the invention, the recording signal input to transducer 13 is appropriately amplified and then subtracted from the signal derived from sensing the deeply recorded signal 25 to yield a net sensed signal which is a desired control signal having reduced interference effects. Such subtraction requires amplitude and phase matching of the signals being processed. When control signal 25 has a relatively narrow bandwidth, such matching need only be accurate over the narrow frequency band. Filter circuits 20 reject those signal components not required for servo positioning control. Subtractive compensation in the servo loop 41, 20, 21 and 22 of FIG. 2 is enabled by adding summing circuit 55 between elements 41 and 20 as best seen in FIG. 3. A subtractive input at 56 is received from a phase shift circuit 57 which adjusts the appropriately amplified write signal from variable gain amplifier 50 to compensate for phase shifts in transducer 13. The data signals amplified by variable gain amplifier 50 are received from utilization circuit 23 over lines 60 at the same time that write circuit 15 receives those signals. VGA 50 and circuit 57 constitute a compensation signal generating means within write signal cancellation path 51.

Path 51 is calibrated by the elements of calibration loop 53 adjusting sample and hold circuit 52 to vary the gain of VGA 50. During such calibration, transducer 13 receives a recording signal purposely designed to contain signal frequency components that overlap the signal frequency components of deeply recorded signal 25. At this time, transducer 13 is preferably not magnetically coupled to a medium 10 or in the alternative, can be magnetically coupled to a calibration portion such as a leader on a magnetic tape, an unused track in the disk and the like. The calibration loop 53 zeroes the voltage at node 54 which is an input to servo circuits 21. A similar technique may be used for phase calibration as required.

To appropriately adjust variable gain amplifier 50, the elements of calibration loop 53 are adjusted under control of summing circuit 61. The suitably filtered signal at node 54 during calibration time will receive no media readback signal from emitter follower buffer 41. Accordingly, all of the signals at node 54 during calibration time are the write signals supplied through subtractive compensation loop 51. Summer 61 supplies its summed signal (with respect to ground reference potential) through amplifier 62 to sample and hold circuit 52. Utilization circuits 23 supply a suitable actuating signal over line 64 to sample and hold circuit 52 for capturing the summer 61 amplified output signal. Calibration time should be long enough to allow the node 54 signal to settle to a null value. This time is not critical, and may be made a fixed time interval. Alternatively, node 54 may be supplied to a comparator 65 which then supplies a comparison signal to utilization circuit 23 for informing circuits 23 when the calibration has been successfully completed. Circuits 23 can include a programmed microprocessor for receiving the output signal of compare 65 for controlling sample and hold 52 in a manner to null the control or calibration loop 51 as above stated.

Figure 4:
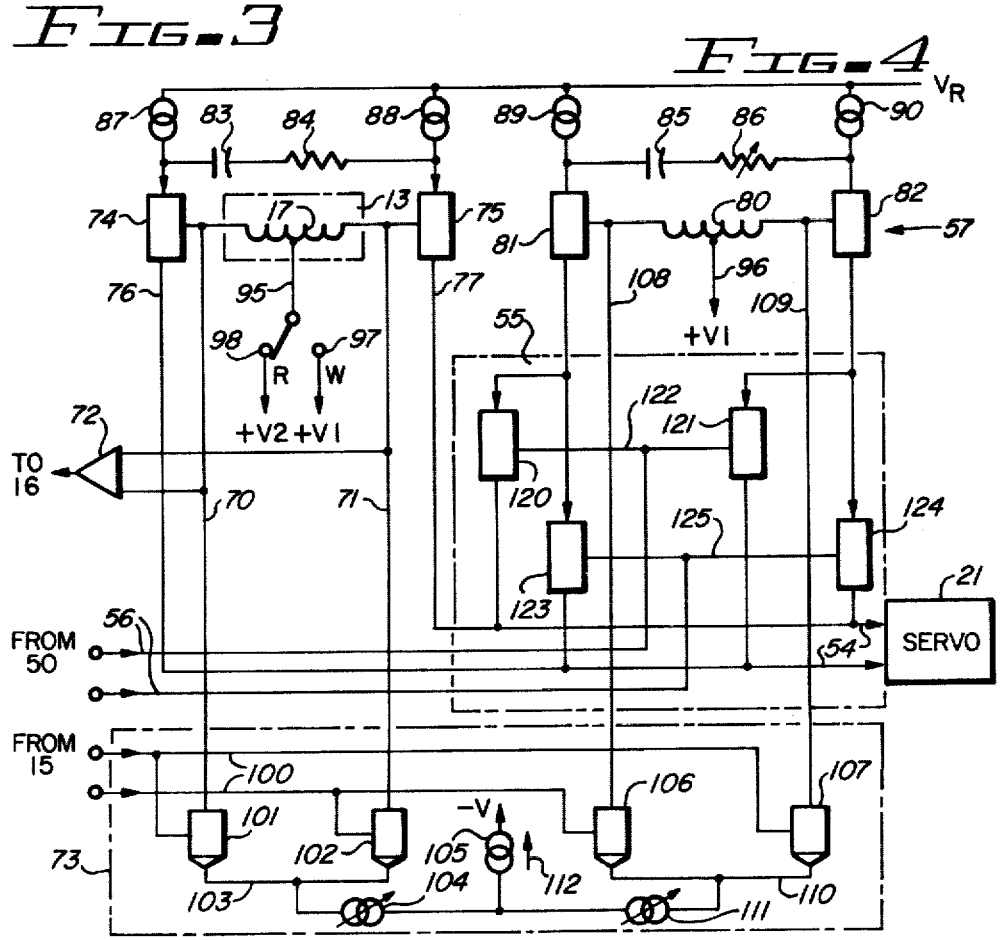
FIG. 4 is a schematic showing of one circuit implementation of the present invention.

Referring particularly to FIG. 4, a preferred embodiment of summer 55 for achieving the subtractive compensation is described. The calibration aspects are not described since FIG. 3 is adequate for that purpose. Center-tapped coil 17 of transducer 13 has its opposite ends connected over read/write lines 70, 71 to an output differential amplifier 72 which is connected in turn to read circuit 16. Lines 70, 71 are also connected to later described write current switching circuit 73 which provides the data recording signal as controlled by write circuits 15 via a pair of lines 100. The transducer 13 connection to servo circuits 21 is through a pair of matched PNP transistors 74, 75 having their respective collectors connected over lines 76, 77 to servo circuits 21. The subtractive compensation provided through summer 55 is based upon coil assembly 80 which is constructed to have the same electrical and magnetic characteristics as transducer 13. Coil assembly 80 is connected to lines 70, 71 in summer 55 via a pair of matched PNP transistors 81, 82 which are connected to coil 80 in the manner identical to the connection of transistors 74, 75 to coil 17. In fact, all of transistors 74, 75, 81, 82 should have substantially similar characteristics. Additionally, RC network 83, 84 connected across the emitters of transistors 74, 75 is similar to the RC network 85, 86 connected across the emitters of transistors 81, 82. Resistor 86 can be made adjustable for adjusting the RC characteristic, as is well known. A plurality of substantially identical current sources 87, 88, 89, 90 provide current to transistors 74, 75, 81, 82, respectively, based upon a single voltage VR.

For compensation during recording (compensation is not required during reading), the center-tap biasing of coil 17 is made identical to coil 80. Coil 80 which is center tapped at 96 is connected to a reference voltage V1. In a similar manner, center tapped coil 17 is connected via lead 95 to W terminal 97 which in turn is connected to reference potential V1. Lead 95 is connected to the R terminal 98 during the readback operation for connecting center tap of coil 17 to reference potential V2, which may be ground reference potential. In this regard, the diagrammatic representation of the coil in head 13 of FIG. 3 is single ended as opposed to center tapped. That diagrammatic representation is intended to indicate a center tapped coil connection, no limitation to practicing the invention to a center tapped coil is intended. The switch between lead 95 and terminal 97, 98 is preferably an electronic transistorized switch. In fact, most of the circuits shown in FIG. 4 can be on a integrated circuit chip.

The data signal to be recorded from write circuit 15 supplied to switching circuit 73 actuates both coils 17 and 80 in an identical manner. Substantially identical NPN transistors 101, 102, 106, 107 respectively, are connected to opposite ends of the coils 17 and 80, as shown. The collectors of transistors 106, 107 are connected to coil 80 via lines 108, 109. The transistor pairs are common emitter coupled as at 103, 110, respectively, for transistors 101, 102 and 106, 107. Common emitter couplings 103, 110 are respectively coupled to current sinks 104, 111 which in turn are connected to a common current sink 105, the current flowing in the direction of arrow 112. Transistors 101, 107 have a common base connection to one of the lines 100 while transistors 102, 106 have a similar common base connection to the opposite line 100. Accordingly, coils 17 and 80 are identically actuated by the data write signal supplied by write circuit 15. Coil 80 provides the phase-shift function of circuit 57.

The components grouped inside dashed line 55 correspond to VGA 50, FIG. 3. VGA 50 receives the output of sample and hold 52 over lines 56. A first pair of matched PNP transistors 120, 121 with their emitters coupled to the collectors of PNP transistors 81, 82, respectively, have a common base connection 122 and provide amplitude compensating signals, respectively, through their collectors to lines 76, 77. In a similar manner, transistors 123, 124 have a common base connection 125 to the other line 56 and have their emitters coupled, respectively, to collectors of transistors 81, 82 and are symmetrically connected to line 76, 77. The connection of line 76 to the collectors of transistors 121, 123 forms a current summing junction, as does the connection of line 77 to transistors 120, 124. Together, these connections constitute summer 55 to provide differential subtractive compensation to the signals on lines 76, 77, which include both sensed signal 25 and some recording signal components. Capacitor 85 and adjustable resistor 86 provide trimmable phase-shift compensation to balance out the relative circuit delays of the signals fed into summer 55. This circuit implements the function of block 57, FIG. 3. Consequently, the resultant servo input signal on lines 54 connected to servo circuit 21 is an enhanced sensed signal from recorded signal 25; that is, transistor 120-124 pass the recording signal fed through transistors 81 and 82 in a proportion to the amplitude compensating signal received from sample and hold 52 to subtract the recording-signal-derived compensation signal from the recording signal and readback signal from transistors 74, 75.

While the invention has been particularly shown and described with reference to a preferred embodiment thereof, it will be understood by those skilled in the art that various changes in form and details may be made therein without departing from the spirit and scope of the invention.

What is claimed is:

1. A magnetic recorder having a single gap magnetic transducer adapted to exchange signals with an adjacent magnetic record medium along a record track being scanned by the transducer, said record medium having a deeply recorded control signal extending along said record track, said control signal being a narrow-band low-frequency signal, the improvement including in combination:
information-bearing signal write means connected to said transducer for supplying information-bearing signals to said transducer for recording same along said record track on the adjacent magnetic medium;
a control signal circuit having low pass frequency characteristics and connected to said transducer for receiving said control signal from said transducer while said write means is supplying said information-bearing signals to said transducer; and
means for simultaneously actuating said write means and said control signal circuit.

2. The magnetic recorder set forth in claim 1 wherein said control signal circuit further includes a servo for generating a track position error signal signal from said control signal and usable to relatively position said transducer and said record medium for faithfully reproducing and recording said information-bearing signals.

3. The magnetic recorder set forth in claims 1 or 2 further including:
- data signal readback means connected to said transducer, and
- control means operative to alternately actuate said data signal readback means with said write means, while simultaneously and continuously enabling operation of said control signal circuit.

4. The magnetic recorder set forth in claim 1, further including:
- compensation signal generating means connected to said information-bearing signal write means for receiving signals to be recorded and adjusting said received signals for supplying a compensating signal; and
- signal combining means electrically interposed between said single gap magnetic transducer and said control signal circuit and connected to said compensating signal generating means for combining said compensating signals with the signal received from said single gap magnetic transducer for supplying enhanced control signals to said control signal circuit.

5. The magnetic recorder set forth in claim 4 wherein said combining circuits means includes:
- signal inversion means whereby said compensating signal and said single gap magnetic transducer signals are subtractively combined.

6. The magnetic recorder set forth in claim 4 further including:
- controllable circuit means in said compensating signal generating means for adjusting said received information-bearing signals;
- sample and hold circuit means connected to said controllable circuit means for varying the operation thereof for adjusting said compensating signal;
- the improvement including further in combination:
- reference signal means connected to said control signal circuit for receiving low pass signals therefrom which were derived from said control signal and supplying said received derived signal to said sample and hold circuit; and
- control means responsive to said received derived signal to adjust said sample and hold circuit to a predetermined state whereby said received derived signal has a predetermined amplitude as determined by the operation of said controllable circuit means.

7. The magnetic recorder set forth in claim 6, wherein said control means supplies a write signal during said calibration having frequency spectra overlapping the frequency spectra of said control signal such that subsequently supplied write signals having a frequency band less than said calibration write signal frequency spectra result in enhanced control signal processing to said control signal circuit.

8. The magnetic recorder set forth in claim 4 further including first circuit means connected to said compensation signal generating means for supplying data signals to be recorded thereto having first predetermined signal characteristics and being connected to said information-bearing signal write means for simultaneously transferring data signals thereto to be recorded as such information-bearing signals;
- reference circuit means in said compensation signal generating exhibiting electrical electrical characteristics substantially similar to the exhibited characteristics of said single gap transducer;
- second circuit means electrically connected to said reference circuit means and to said information-bearing signal write means for transferring signals from said information-bearing write means to said reference circuit means at the same time such signals are being transferred to said single gap transducer;
- signal inverting and coupling means in said signal combining means and electrically interposed between said reference circuit means and said control signal circuit and connected to said compensating signal generating means and being responsive thereto to variably couple said reference circuit means to said combining circuit means such that the compensation signal is phase adjusted by said reference circuit means for more precisely compensating the readback control signal for enhancing operation thereof.

9. The magnetic recorder set forth in claim 1 wherein said information bearing signal write means supplies a recording signal of sufficient amplitude to said single gap transducer for pole tip saturating said single gap transducer whereby the effective gap for said low frequency control signal is effectively lengthened whereby the responsiveness of said single gap transducer for sensing said low frequency control signal is enhanced.

10. The magnetic recorder set forth in claim 1 wherein said magnetic medium has a plate-like substrate, a first magnetic coating on a first face of said substrate and a second magnetic coating on a second face of said substrate, said control signal being recorded on said second magnetic coating and said single gap transducer being immediately adjacent said first magnetic coating for exchanging data signals therewith; and
- said information bearing signal write means supplying a sufficient current amplitude during recording for effectively lengthening the gap of said single gap transducer whereby the low frequency components of said control signal in said second magnetic coating are sensed by said effectively lengthened gap.

11. A magnetic recorder having a single gap magnetic transducer adapted to record and reproduce signals from a juxtaposed magnetic record medium by scanning a record track thereon, the improvement including in combination:
- a control signal read circuit connected to said transducer for receiving signals therefrom in a first frequency domain;
- a data read circuit connected to said transducer for recovering signals therefrom in a second frequency domain different from said first frequency domain including an overlapping portion with respect to said first frequency domain;
- a data write circuit connected to said transducer for supplying a signal to be recorded in said second frequency domain;
- a read signal compensating circuit connected to said data write circuit for receiving said signal to be recording and having means to generate a compensating signal;
- a signal combining circuit electrically interposed between said transducer and said read circuit for compensating for signal portions of said signal to be recorded that exhibit frequency components residing in said first frequency domain.

12. The magnetic recorder set forth in claim 11 further including calibrating means connected said read signal compensating circuit and to said data write circuit for receiving data write signals exhibiting predetermined characteristics and responsive thereto for adjusting said read signal compensating circuit operation to accommodate said data write signals in a predetermined manner.

13. A magnetic recorder having a single gap transducer adapted to scan a magnetic record member;
the improvement comprising recording means, read circuit means, and signal compensating means, all said means connected to said single gap transducer and all said means being simultaneously active for simultaneously transferring signals to and from said transducer and said signal compensating means being electrically responsively connected to said recording means for receiving signals therefrom and electrically interposed between said single gap transducer and read circuit means for removing write signal components from signals transferred to said read circuit means.

14. The recorder set forth in claim 13 wherein said recording circuit means supplies information-bearing signals to said single gap transducer in a first higher frequency domain, and said read circuit means having a first portion for receiving signals from said single gap transducer in a second lower frequency domain.

15. The recorder set forth in claims 13 or 14 including control circuit means connected to said read circuit means and responsive to said read circuit means to supply an electrical indication of an instant positional relationship between said magnetic record member and said single gap transducer.

16. The method of operating a magnetic signal transducer having a given gap adapted to be relatively movably disposed in juxtaposition to a magnetic record member for enabling signal transfers with respect to said juxtaposed record medium,
the steps of:
recording information-bearing signals through said given gap onto a track on said record medium in a first track depth; and
simultaneously, while recording said information-bearing signals, sensing signals previously recorded at a depth below said first depth on said track of said record medium through said given gap.

17. The method set forth in claim 16 further including supplying said recording signals to said magnetic signal transducer in such amplitude as to tend to saturate the pole tips of said transducer whereby the effective gap for low frequency signals is effectively elongated; and
limiting said simultaneously sensed signals to be low frequency signals at least when signals are to be recorded on said record medium.

18. The methods set forth in claims 16 or 17 further including the steps of:
deriving a compensating signal from said signals being recorded, said compensating signal having amplitude and phase characteristics representative of the signals being recorded as they appear in said magnetic signal transducer; and
subtractively combining said compensating signals with said signals being sensed while the signals are being recorded for enhancing the signals being sensed.

19. The method set forth in claim 18 further including analyzing said signals being sensed and supplying an electrical indicating signal indicating a control function to be performed with respect to said magnetic signal transducer.

20. The method set forth in claim 19 further including adjusting the relative position of said magnetic signal transducer and said juxtaposed record medium in accordance with said control indicating signal whereby recording and sensing signals with respect to said record medium is enhanced.

21. The method set forth in claim 18 further including the steps of:
physically separating said magnetic signal transducer and said juxtaposed record medium whereby there is no magnetic coupling therebetween and adjusting said subtractive compensation while said transducer and said record medium are separated whereby said adjustment enhances the simultaneous recording and sensing of signals through a single gap.

22. The method of recording information-bearing signals on a magnetic recording medium relatively movable with respect to a single gap transducer and said medium having deeply recorded signals thereon;
the steps of:
recording said information-bearing signals onto said magnetic medium through said gap of said single gap transducer;
simultaneously and through the same transducer gap sensing said deeply recorded signal;
electrically separating said sensed deeply recorded signal from said information-bearing signals to supply an indicating signal; and
adjusting the operation of said single gap transducer relative to said magnetic record medium in accordance with said indicating signal.

23. The method set forth in claim 22 wherein said adjustment is an adjustment lateral to the length of a track being scanned by said transducer on said magnetic record medium.

24. The method set forth in claims 22 or 23 wherein said separating steps include the steps of modifying the amplitude and phase of said information-bearing signals to generate a compensating signal; and
combining said compensation signal with said sensed deeply recorded signal whereby signal components of said information bearing signals present with said sensed deeply recorded signals are effectively removed whereby the adjusting function is more faithfully produced.

25. A data recording system for continuously writing data along a recording track on a recording medium (10), the recording track being defined by a buried servo track, the system including a transducer (13) provided with a write gap (14), and a continuous transducer/track position controlling servo-loop (40, 41, 20, 37, 41, 42, 43, 22) characterized in that the servo-loop includes the write gap (14), and information-bearing signal write means coupled to the transducer for supplying information bearing signals to the transducer for recording; a control signal circuit having low pass frequency characteristics and connected in the servo-loop to the transducer for receiving control signals from the transducer while the write means is supplying information bearing signals to the transducer; and means for simultaneously actuating the write means and the control signal circuit.

26. A system as claimed in claim 25 characterized in that it includes data signal readback means coupled to the transducer, and control means operative to actuate the data signal readback means or the write means (but not both), while simultaneously and continuously enabling operation of the control signal circuit, so that the write gap also serves as the read gap.

27. A system as claimed in either of claims 25 or 26 characterized in that it includes compensation signal generating means connected to the information-bearing signal write means for receiving signals to be recorded and adjusting such received signals for supplying a compensating signal; and signal combining means in the servo-loop, electrically interposed between the transducer and the control signal circuit and connected to the compensating signal generating means for combining generated compensating signals with the signal received from the transducer to supply enhanced control signals to the control signal circuit.

28. A system as claimed in claim 27 characterized in that the signal combining means includes a signal inversion circuit whereby the compensating and transducer signals are subtractively combined.

29. A system as claimed in claim 27 characterized in that it includes controllable circuit means in the compensating signal generating means for adjusting received information-bearing signals; sample and hold circuit means connected to the controllable circuit means for varying the operation relative to adjustment of signals, reference signal means connected to the control signal circuit for receiving low pass signals therefrom derived from control signals from the transducer and supplying such received derived signal to the sample and hold circuit; and control means responsive to such received derived signal to adjust the sample and hold circuit to a predetermined state whereby such received derived signal has a predetermined amplitude as determined by the operation of the controllable circuit means.

30. A system as claimed in claim 29 characterized in that the control means is arranged to supply a write signal during calibration having frequency spectra overlapping the frequency spectra of the control signal such that subsequently supplied write signals having a frequency band less than the calibration write signal frequency spectra result in enhanced control signal processing to the control signal circuit and means are provided for disassociating the transducer from any magnetic medium during calibration.

31. A system as claimed in claim 27 characterized in that it includes further first circuit means connected to the compensation signal generating means for supplying data signals to be recorded thereto having first predetermined signal characteristics and being connected to the information-bearing signal write means for simultaneously transferring data signals thereto to be recorded as such information-bearing signals; reference circuit means in the compensation signal generating exhibiting electrical characteristics substantially similar to the exhibited characteristics of the transducer; second circuit means electrically connected to the reference circuit means and to the information-bearing signal write means for transferring signals from the information-bearing write means to the reference circuit means at the same time such signals are being transferred to the transducer; and signal inverting and coupling means in the signal combining means and electrically interposed between the reference circuit means and the control signal circuit and connected to the compensating signal generating means and being responsive thereto to variably couple the reference circuit means to the combining circuit means such that the compensation signal is phase adjusted by the reference circuit means for more precisely compensating the readback control signal for enhancing operation thereof.

* * * * *